United States Patent
Hjelt et al.

(10) Patent No.: US 10,182,321 B2
(45) Date of Patent: *Jan. 15, 2019

(54) WIRELESS DATA TRANSFER

(71) Applicant: Facebook, Inc., Menlo Park, CA (US)

(72) Inventors: Joonas Emil Hjelt, Helsinki (FI); Lauri Jaakko Vuornos, Helsinki (FI)

(73) Assignee: FACEBOOK, INC., Menlo Park, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/549,713

(22) Filed: Nov. 21, 2014

(65) Prior Publication Data

US 2015/0296437 A1 Oct. 15, 2015

(51) Int. Cl.
*H04W 4/24* (2018.01)
*H04M 15/00* (2006.01)
*H04W 12/06* (2009.01)

(52) U.S. Cl.
CPC ............. *H04W 4/24* (2013.01); *H04M 15/72* (2013.01); *H04M 15/80* (2013.01); *H04W 12/06* (2013.01)

(58) Field of Classification Search
CPC .................................................... H04W 40/04
USPC ........................................................ 370/328
See application file for complete search history.

(56) References Cited

U.S. PATENT DOCUMENTS

| | | | | |
|---|---|---|---|---|
| 7,856,659 B2* | 12/2010 | Keeler | ................. | G06Q 20/206 726/12 |
| 8,340,634 B2 | 12/2012 | Raleigh | | |
| 8,437,358 B2 | 5/2013 | Shin et al. | | |
| 8,767,544 B1* | 7/2014 | Khanka | ................... | H04W 4/00 370/232 |
| 9,603,059 B2* | 3/2017 | Vuornos | ............. | H04L 12/1432 |
| 2003/0233580 A1 | 12/2003 | Keeler et al. | | |
| 2006/0141984 A1* | 6/2006 | Taglienti | ................. | H04L 12/14 455/406 |
| 2010/0198939 A1* | 8/2010 | Raleigh | ............... | H04L 41/0806 709/217 |
| 2010/0241891 A1* | 9/2010 | Beasley | ................ | G06F 11/008 714/1 |
| 2011/0199977 A1* | 8/2011 | Hammell | ............ | H04L 63/0272 370/328 |
| 2011/0276442 A1 | 11/2011 | Momtahan et al. | | |
| 2012/0108200 A1 | 5/2012 | Rubin et al. | | |
| 2012/0254285 A1 | 10/2012 | Tiger et al. | | |
| 2013/0053013 A1 | 2/2013 | Giaretta et al. | | |
| 2013/0111091 A1 | 5/2013 | Chun | | |

(Continued)

OTHER PUBLICATIONS

International Search Report and Written Opinion received for PCT Patent Application No. PCT/US2014/067063, dated Mar. 13, 2015, 10 pages.

(Continued)

*Primary Examiner* — Peter G Solinsky

(57) ABSTRACT

Techniques for setting up wireless data transfer are described. In one embodiment, for example, an apparatus may be configured to monitor network traffic. A context or origin of the network traffic may be determined. Control options for setting up a wireless data transfer may be determined and presented to a user. Based upon user input, a control option may be selected. Routing network traffic may be performed based upon the selected control option. Other embodiments are described and claimed.

27 Claims, 10 Drawing Sheets

(56) References Cited

U.S. PATENT DOCUMENTS

| | | | | |
|---|---|---|---|---|
| 2014/0006633 A1* | 1/2014 | Uchikawa | ............ | H04W 76/02 |
| | | | | 709/227 |
| 2014/0024339 A1* | 1/2014 | Dabbiere | ............ | H04M 15/885 |
| | | | | 455/406 |
| 2014/0237117 A1 | 8/2014 | Cha | | |
| 2014/0237351 A1* | 8/2014 | Seidl | ................ | G06F 17/30905 |
| | | | | 715/234 |
| 2014/0269525 A1* | 9/2014 | Li | ........................ | H04W 76/02 |
| | | | | 370/329 |

OTHER PUBLICATIONS

Office Action received for United Kingdom Patent Application No. GB1406465.03, dated Jul. 31, 2014, 7 pages.

\* cited by examiner

WIRELESS DATA TRANSFER

FIELD OF INVENTION

The invention relates to context-dependent wireless data transfer and sales. In particular, but not exclusively, the invention relates to setting up and selling plans for app-specific wireless data transfer from a mobile device or a computer program on a mobile device.

BACKGROUND OF THE INVENTION

Personal mobile devices, such as smartphones or tablets, are increasingly using applications, apps, that utilize or even require wireless data transfer over mobile networks. Accordingly, the amount of data transferred over mobile network is increasing and in order to enjoy the use of a mobile device, a user needs to have access to mobile data services.

Traditionally, a user purchases a mobile data plan from an operator, for example from a retail or call centre, or increasingly from internet. However, such data plans cannot be provided instantly when they are needed, nor can they be set up from the mobile device with which they are meant to be used. In addition, such data plans are for generic purposes rather than fit for the precise need of the user. More importantly, such data plans are created on the network of the operator and require changes to the network.

Systems providing the user a possibility to subscribe to a mobile data from the mobile device with which the data plan is used exist. For example the device may comprise an application provided by the operator with which a mobile data plan can be subscribed to, or a mobile data plan may be requested for example using short messaging service (SMS). However, such solutions again require the data plan to be set up on the operator network. Furthermore, some prior art technologies provide dedicated systems in the device for subscribing to mobile data, but such systems require pre-installation and changes to the operation system of the mobile device and are accordingly available for certain dedicated devices only. In addition, such prior art systems are typically not optimized for the world centered on the apps. Finally, the systems may also require modifications to the operator network. Systems of the above types are known e.g. from patent applications US2012108200A and WO13112642A2.

Furthermore, applications providing control and monitoring of mobile data usage exist, with the possibility of controlling the data usage of a certain application also. Such systems, known e.g. from patent applications US2012254285A and US2011276442A, do not address the problem of setting up a mobile data plan from the mobile device.

Finally, the known applications do not provide the possibility to set up a wireless data transfer depending on the app requesting the data transfer and/or on the context of the data transfer.

It is an object of the invention to mitigate the shortcomings of the prior art by providing a context-dependent wireless data transfer by providing a method and system according to the aspects of the invention for app-specific and contextual data transfer setup on a mobile device. It is a further object of the invention to provide for a convenient purchase of data directly from a mobile device, contextually right for app usage with an enhanced user experience without hindrance to using the mobile device, such as a smartphone.

SUMMARY

According to a first aspect of the invention there is provided a method for setting up wireless data transfer, comprising
  monitoring network traffic from an apparatus;
  determining a context and/or origin of the network traffic;
  determining and presenting control options for setting up a wireless data transfer;
  selecting a control option based on user input; and
  routing the network traffic.

Monitoring network traffic may comprise monitoring the addresses, ports, operating system user identifiers, application package names, sockets and/or user identifications of network packets.

Determining the context and/or origin may comprise mapping the network traffic to an app being executed in the apparatus.

The mapping may comprise detecting dependencies between applications and dynamically updating the algorithms used in the mapping.

Determining the context and/or origin may comprise mapping the network traffic to a service available in the network.

Determining the context and/or origin may comprise mapping the network traffic to a network address.

Determining the context and/or origin may comprise mapping the network traffic to a protocol to be used.

Determining and presenting the control options may comprise retrieving the control options from the network.

Determining and presenting the control options may comprise displaying the control options on a user interface element.

The control options may comprise a context-specific data transfer, a time-dependent data transfer and/or a data-dependent data transfer.

The control options may comprise sponsored data transfer.

Routing network traffic may comprise routing the traffic depending on available connections.

The apparatus may comprise a mobile electronic device.

The method may be carried out by an app, or an app within a further app, executed in an apparatus, by a processor, or by a chipset.

According to a second aspect of the invention there is provided a method for setting up wireless data transfer, comprising
  receiving a request for network traffic from an apparatus;
  identifying and authenticating a user behind the request for network traffic;
  determining and sending to the apparatus control options for setting up a wireless data transfer;
  receiving a selected control option based on user input;
  setting up the wireless data transfer according to the selected control option with an operator network;
  sending a confirmation to the apparatus; and
  routing the network traffic.

The request for network traffic may comprise a context and/or origin of the network traffic.

The context and/or origin may comprise an identification of an app being executed in the apparatus.

The context and/or origin may comprise an identification of a service available in the network.

The context and/or origin may comprise an identification of a network address.

The context and/or origin may comprise an identification of a protocol to be used.

The user may be identified using an identifier of the operator network and the apparatus.

Determining the control options may comprise determining the control options based on the context and/or origin of the network traffic.

The wireless data transfer may be set up with the operator network.

Routing the network traffic may comprise forwarding the network traffic unmodified.

According to a third aspect of the invention there is provided an apparatus comprising a processor configured to cause
- monitoring network traffic from the apparatus;
- determining a context and/or origin of the network traffic;
- determining and presenting control options for setting up a wireless data transfer;
- selecting a control option based on user input; and
- routing the network traffic.

The processor may be configured to cause monitoring the network traffic by monitoring the addresses, ports and/or user identifications of network packets.

The processor may be configured to cause determining the context and/or origin of the network traffic by mapping the network traffic to an app being executed in the apparatus.

The processor may be configured to cause determining the context and/or origin of the network traffic by mapping the network traffic to a service available in the network.

The processor may be configured to cause the mapping comprising detecting dependencies between applications and dynamically updating the algorithms used in the mapping.

The processor may be configured to cause determining the context and/or origin of the network traffic by mapping the network traffic to a to a network address.

The processor may be configured to cause determining the context and/or origin of the network traffic by mapping the network traffic to a protocol to be used.

The processor may be configured to cause determining the control options by retrieving the control options from the network.

The processor may be configured to cause presenting the control options on a user interface element of the apparatus.

The control options may comprise a context-specific data transfer, a time-dependent data transfer and/or a data-dependent data transfer.

The control options may comprise sponsored data transfer.

The processor may be configured to cause routing the network traffic depending on available connections.

The apparatus may comprise a mobile electronic device.

The processor may be configured to execute an app, or an app within a further app in order to cause monitoring network traffic from the apparatus;
- determining a context and/or origin of the network traffic;
- determining and presenting control options for setting up a wireless data transfer;
- selecting a control option based on user input; and
- routing the network traffic.

According to a fourth aspect of the invention there is provided an apparatus comprising a processor configured to cause
- receiving a request for network traffic;
- identifying and authenticating a user behind the request for network traffic;
- determining and sending control options for setting up a wireless data transfer;
- receiving a selected control option based on user input;
- setting up the wireless data transfer according to the selected control option with an operator network;
- sending a confirmation; and
- routing the network traffic.

The request for network traffic may comprise a context and/or origin of the network traffic.

The context and/or origin may comprise an identification of an app being executed.

The context and/or origin may comprise an identification of a service available in the network.

The context and/or origin may comprise an identification of a network address.

The context and/or origin may comprise an identification of a protocol to be used.

The processor may be configured to cause identifying the user using an identifier of the operator network.

The processor may be configured to cause determining the control options based on the context and/or origin of the network traffic.

The processor may be configured to cause setting up the wireless data transfer with the operator network.

The processor may be configured to cause routing the network traffic by forwarding the network traffic unmodified.

The apparatus may comprise a server, a cloud service, and/or software executed in a network.

According to a fifth aspect of the invention there is provided a system comprising the apparatus of the third aspect of the invention and of the fourth aspect of the invention.

According to a sixth aspect of the invention there is provided a computer program comprising computer executable program code that when executed causes a computer to execute a method according to the first aspect of the invention.

According to a seventh aspect of the invention there is provided a computer program comprising computer executable program code that when executed causes a computer to execute a method according to the second aspect of the invention.

According to an eighth aspect of the invention, there is provided a non-transitory memory medium comprising the computer program of the sixth aspect of the invention.

According to a ninth aspect of the invention, there is provided a non-transitory memory medium comprising the computer program of the seventh aspect of the invention.

Any memory medium described hereinbefore or hereinafter may comprise a non-transitory non-volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, holographic storage, opto-magnetic storage, phase-change memory, resistive random access memory, magnetic random access memory, solid-electrolyte memory, ferroelectric random access memory, organic memory, polymer memory or a smart card. The memory medium, or a plurality of memories, may be formed into a device without other substantial functions than storing memory or it may be formed as part of a device with other functions, including but not limited to a memory of a computer, a chip set, and a sub assembly of an electronic device. Further still, any memory may serve the sole purpose of storing data, or it may be constructed as a part of an apparatus serving other purposes, such as processing data.

Different embodiments of the present invention will be illustrated or have been illustrated only in connection with some aspects of the invention. A skilled person appreciates that any embodiment of an aspect of the invention may apply to the same aspect of the invention and other aspects of the invention.

BRIEF DESCRIPTION OF THE DRAWINGS

The invention will now be described, by way of example, with reference to the accompanying drawings, in which.

DETAILED DESCRIPTION

In the following description, like numbers denote like elements. It should be appreciated that the illustrated figures are not entirely in scale, and that the figures mainly serve the purpose of illustrating embodiments of the invention.

Figure 1:
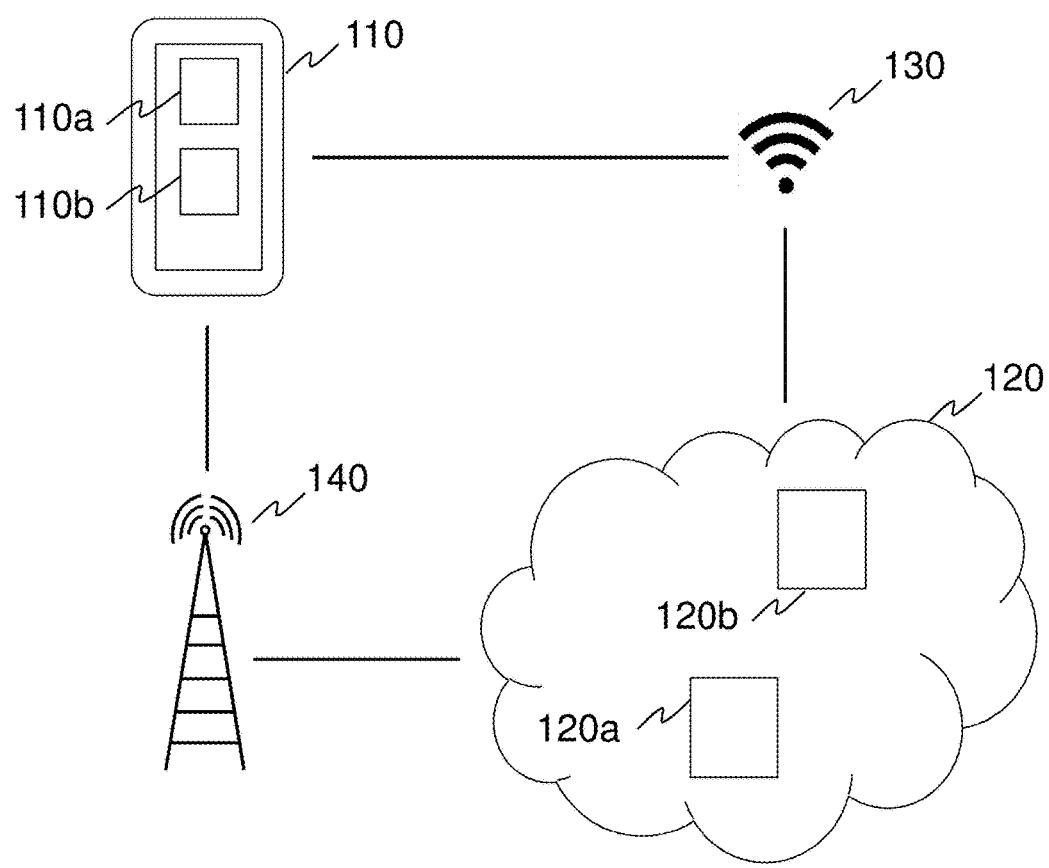
FIG. 1 shows an example environment in which a system according to an aspect of the invention is implemented.

FIG. 1 shows an example environment in which a system according to an aspect of the invention is implemented. FIG. 1 shows an apparatus 110, for example a personal electronic device such as a mobile phone, a smartphone, a tablet computer or an e-book reader. The apparatus 110 is used to execute software or applications, apps, 110a,110b. The applications comprise for example applications that function as clients for using a service 120a,120b on the internet 120. The applications 110a,110b in an embodiment use multiple services in the internet, e.g. the application 110a uses both services 120a and 120b. Such client applications comprise for example social media applications such as Facebook™, Twitter™ or Instagram™, as well as applications such as music, maps, navigation, game and search applications. The apparatus 110 is configured to connect to the internet via wireless network connections, for example vie Wireless Local Area Network, WLAN, 130 or via mobile or cellular network 140, such as 3G network, provided by a mobile operator. In order to access the mobile network, the apparatus 110 a connection needs to be set up with the operator network. In some cases a user of the apparatus 110 has subscribed to a package of network usage, often for a certain period of time or for a certain data amount for a fixed price or each usage of mobile network is charged based on the time and/or data transfer used. Such packages might be expensive, lack transparency of cost control and need complicated setting up prior to the need of use arising.

Figure 2:
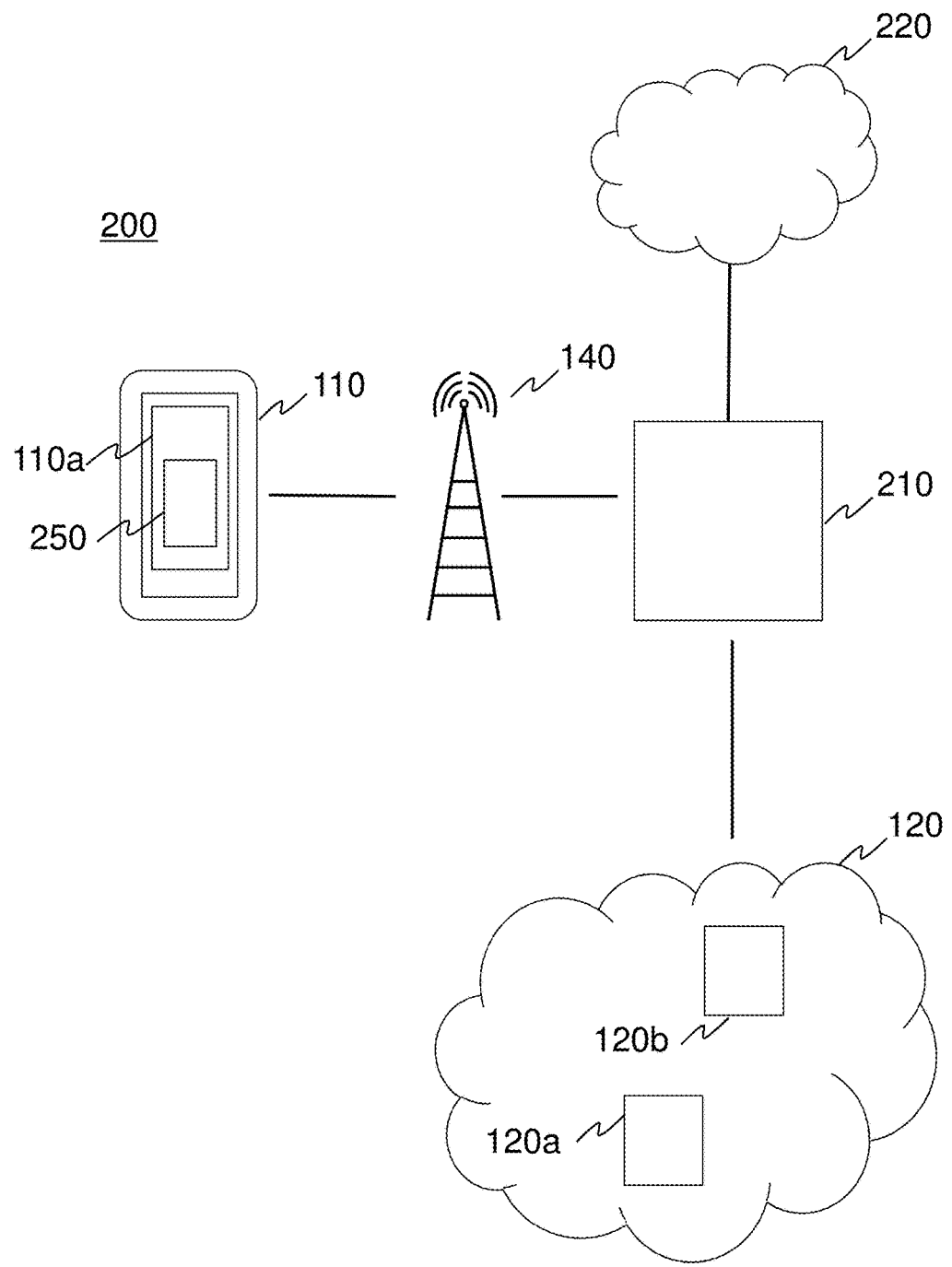
FIG. 2 shows a schematic presentation of the system according to an aspect of the invention.

FIG. 2 shows a schematic presentation of the system according to an aspect of the invention. FIG. 2 shows an apparatus 110, for example a personal electronic device such as a mobile phone, a smartphone, a tablet computer or an e-book reader. The apparatus 110 is executing an application, apps, 110a, for example an application that functions as clients for using a service 120a or 120b on the interact 120. The application 110a requires an interact connection and no wireless local area network (WLAN) is available. The apparatus 110 is configured to connect to the internet via wireless network connections, for example via Wireless Local Area Network, WLAN, 130 or via mobile or cellular network 140, such as 3G network, provided by a mobile operator. However, the user of the apparatus 110 has no account, or arrangement, for using the mobile network of the operator 140, and accordingly, an application 250 according to an aspect of the invention is executed. The application 250 is in an embodiment pre-installed in the apparatus 110, or the user of the apparatus 110 has downloaded it into the apparatus 110 for example from an application store. In a further embodiment the application 250 is a part of another application, for example 110a or any other app, and in a yet further embodiment preinstalled for example on a chipset, e.g. 380 in FIG. 3b, main CPU, 330 in FIG. 3b, or as a part of an operating system of the apparatus 110. As hereinafter described in detail, the app 250 is configured to carry out a method according to the invention, comprising recognizing the desired data traffic and setting up a mobile network connection accordingly, i.e. allowing the user to purchase a mobile data connection for immediate use directly from the apparatus 110. FIG. 2 further shows a server 210 connected to the edge of the operator network 140. The server 210, implemented in ways hereinafter described, is in communication with the client app 250, and in an embodiment with a cloud service 220 to set up the mobile network connection from the app 250 for the app 110a without need for configuring the operator network 140. In an embodiment, the app 250 is configured to monitor usage of the network and usage of applications in the apparatus 110 as hereinafter described. Furthermore, in an embodiment, the app 250 is launched, or triggered, to be executed as needed or the app 250 is configured to be executed as a background task and the user interface of the app is brought forth as needed depending on the other events on the apparatus 110.

Figure 3A:
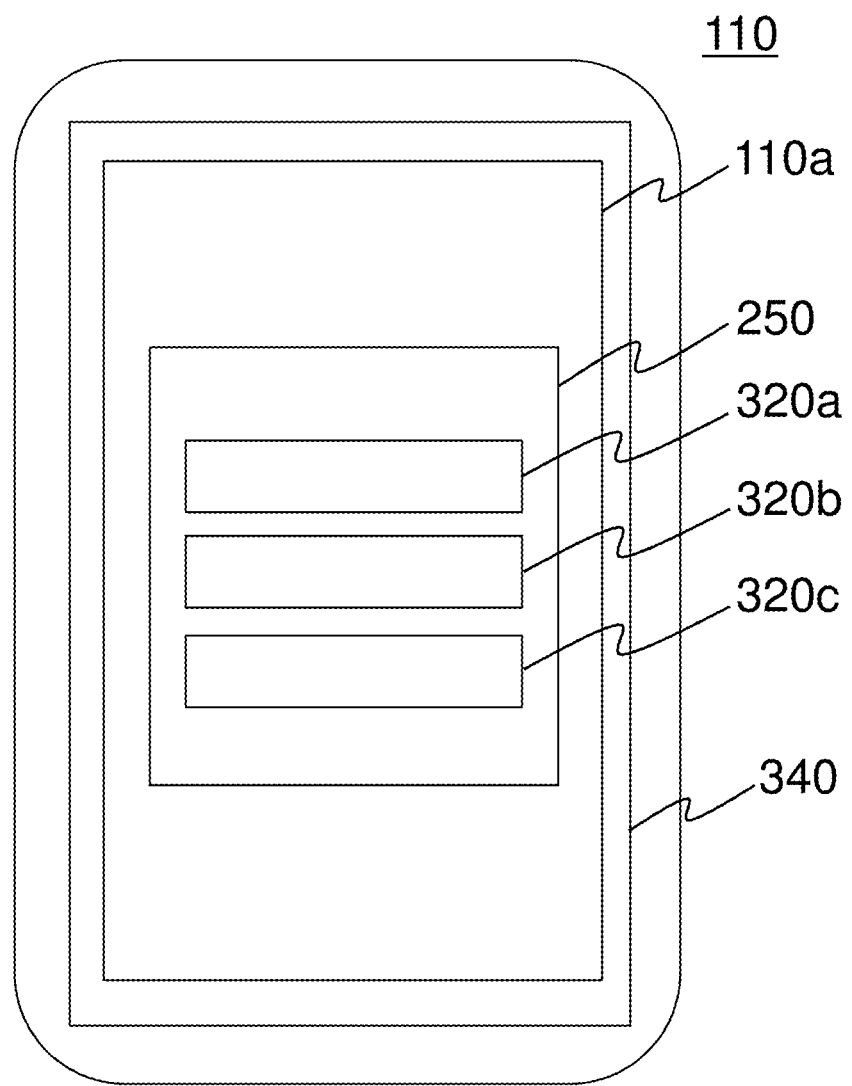
FIG. 3a shows a schematic presentation of an apparatus according to an aspect of the invention.

FIG. 3a shows a schematic presentation of an apparatus according to an aspect of the invention. The apparatus 110 according to an embodiment comprises an electronic device such as a smartphone. The apparatus 110 comprises a user interface unit 340, such as a touch sensitive display for operating and controlling the apparatus and the apps available for use with the apparatus. FIG. 3a shows an app 110a being run on the apparatus, the app 110a is for example, as hereinbefore described, a social media app which requires an internet connection e.g. for sharing content with other users. In order to establish an internet connection using a mobile network, an app 250 according to the invention is executed in the apparatus 110 and a control interface of the app 250 providing the user options for setting up the wireless internet connection is provided on the user interface unit 340. The control interface of the app 250 provides the user with options for setting up the wireless internet connection, such as choice of an app-specific connection, i.e. a context-dependent wireless data transfer, a time-dependent connection, e.g. use of the wireless connection for certain period of time, and/or a data-dependent connection, i.e. use of the wireless connection for a certain amount of data to be transferred. In an embodiment, the control options 320a-c presented comprise the price of the option, i.e. the price to be paid by the user for setting up the wireless data transfer according to of the option. According to the invention, the wireless connection using a mobile network will be set up from the apparatus by choosing the desired option, i.e. without delay and from the device that will be using the connection as hereinafter described.

Figure 3B:
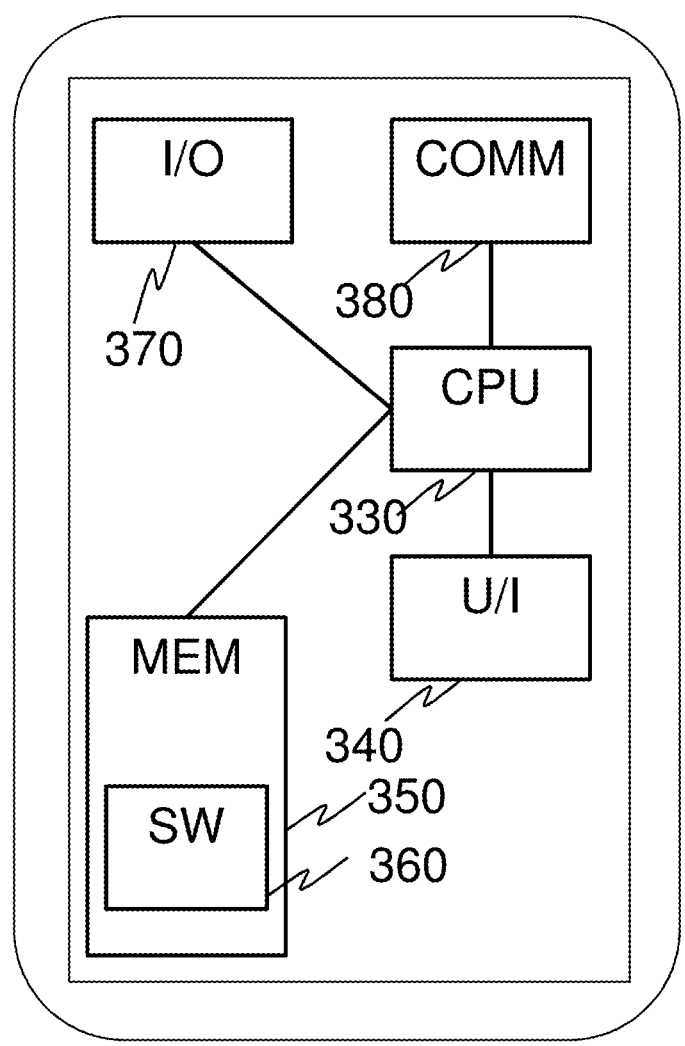
FIG. 3b shows a schematic block diagram of an apparatus according to an aspect of the invention.

FIG. 3b shows a schematic a block diagram of an apparatus 110 according to an embodiment of the invention. The apparatus 110 comprises a communication interface module 380, a processor 330 coupled to the communication interface module 380, and a memory 350 coupled to the processor 330. The apparatus further comprises an input/output (I/O) unit 370 and the user interface (U/I) unit 340, such as a touch sensitive display, which are coupled to the processor 330.

The memory 350 comprises a work memory and a non-volatile memory such as a read-only memory, flash memory, optical or magnetic memory. In the memory 350, typically at least initially in the non-volatile memory, there is stored software 360, or applications or apps, operable to be loaded into and executed by the processor 330. The software 360 may comprise one or more software modules and can be in the form of a computer program product that is software stored in a memory medium. In the context of this document, a "memory medium" may be any non-transitory media or means that can contain, store, communicate, propagate or transport the instructions for use by or in connection with an instruction execution system, apparatus, or device, such as a computer.

It shall be understood that any coupling in this document refers to functional or operational coupling; there may be intervening components or circuitries in between coupled elements unless expressly otherwise described.

The communication interface module 380 is configured to provide local communications over one or more local links. The links may be wired and/or wireless links. The communication interface 380 may further or alternatively implement telecommunication links suited for establishing links with other users or for data transfer, e.g. using the Internet. For connecting to the internet, for example when using software 350, i.e. apps, stored in the memory 350 and executable by the processor 330, the communication interface 380 is configured to establish a connection for example using a cellular or mobile operator network, such as a 3G, GPRS, EDGE or LTE network. For such a connection, a mobile internet access is set up with the mobile operator. Further telecommunication links may be links using any of: wireless local area network links, Bluetooth, ultra-wide-band, cellular or satellite communication links.

The processor 330 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 3b shows one processor 330, but the apparatus 110 may comprise a plurality of processors. In an embodiment, the apparatus 110 comprises a processor operable to execute a method according to an embodiment of the invention in order to set up a context-dependent wireless data transfer according to the invention.

A skilled person appreciates that in addition to the elements shown in FIG. 3b, the apparatus 110 may comprise other elements, such as microphones, displays, as well as additional circuitry such as a camera unit, further input/output (I/O) circuitries, memory chips, application-specific integrated circuits (ASIC), processing circuitry for specific purposes such as source coding/decoding circuitry, channel coding/decoding circuitry and ciphering/deciphering circuitry. Additionally, the apparatus 110 may comprise a disposable or rechargeable battery (not shown) for powering the apparatus if external power supply is not available.

Figure 4:
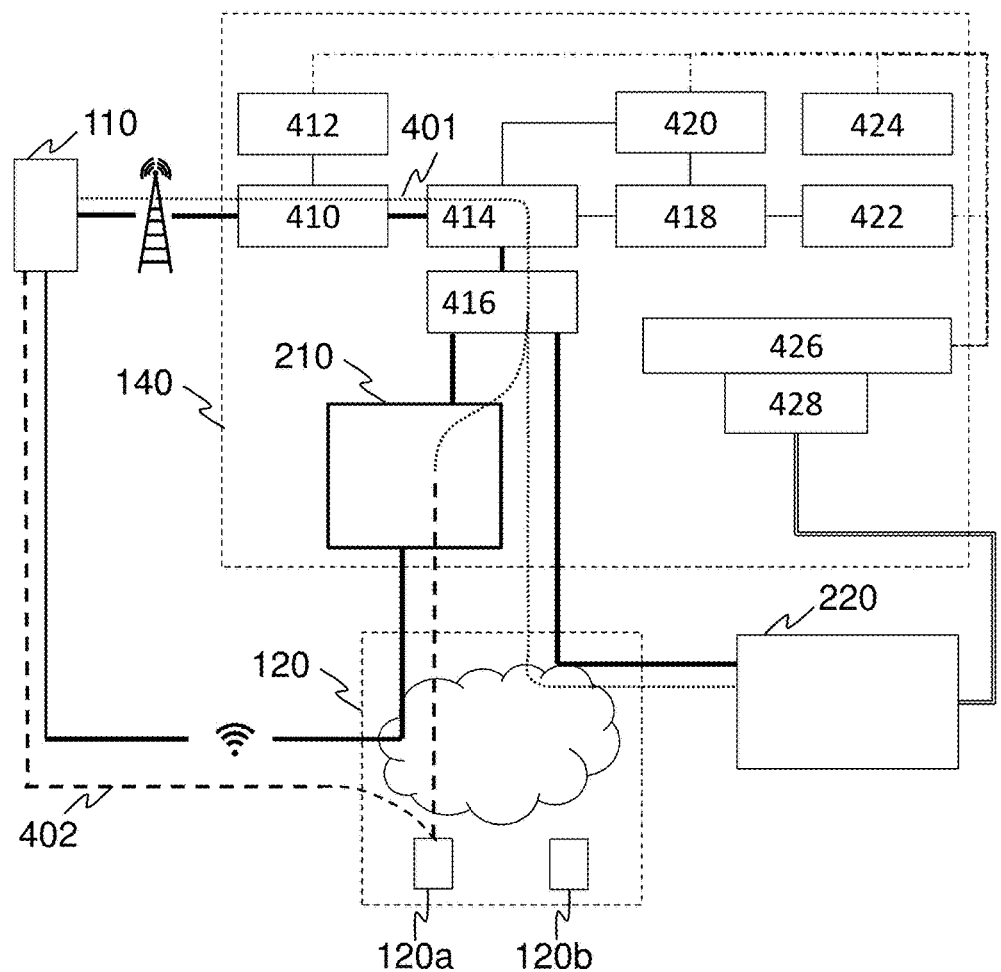
FIG. 4 shows a block diagram of a system according to an aspect of the invention and of the environment in which the system according to the invention is used.

FIG. 4 shows a block diagram of a system according to an aspect of the invention and of the environment in which the system according to the invention is used. FIG. 4 shows a typical operator network and the elements thereof, for example as defined in the standard 3GPP TS 23.203 version12.3. A skilled person appreciates that the elements of the typical operator network are shown merely to illustrate the functioning of the system according to the invention, and the presence of the shown elements is merely optional to the system according to the invention.

FIG. 4 shows a Short Message Service Center/Messaging Manager (SCMS/MMX) element 412 used in an embodiment to send short messages to the apparatus 110 from the server 210 and/or the cloud service 220; an Online Charging System (OCS) element 420 used in an embodiment for charging the wireless network usage set up according to the invention in collaboration with the cloud service 220; a Business Support System (BSS) element 424 used in an embodiment to activate the wireless network connection for conventional operator data package subscriptions, i.e. to activate the service the user of the apparatus 110 has chosen to set up with the app 250; a Policy and Charging Rules Function (PCRF) element 418 used in an embodiment to implement zero-rating for wireless connections of the app 250 with the server 210 and/or cloud 220; and a Subscriber Profile Repository/User Data Repository (SPR/UDR) element 422 used in an embodiment to maintain a substantially real-time status of the wireless network connections the user of the apparatus 110 has set up with the app 250 and/or subscribed to in a further manner. A skilled person appreciates that the above elements of the operator network are illustrated in order to clarify the operating environment of embodiments of the invention and are not essential to the invention as hereinbefore noted. FIG. 4 further shows a Serving GPRS Support Node (SGSN) element 410; a Gateway GPRS Support Node/Packet Data Network Gateway (GGSN/PGW) element 414 used in an embodiment to enforce the zero-rating of the traffic thru server 210, and of the app 250 according to the invention; and an Internet Gateway element 416 used in an embodiment for enriching data flow with information about the subscriber and services; and an Application Programming Interface (API) integration element 428 together with a mediation element 426 for integrating in an embodiment the system according to the invention into the typical operator network 140. The server 210 is connected to the edge of the operator network 140, in such a manner that it requires substantially no modification to the operator network—only bypassing of charging and the zero-rating and header enrichment as described hereinbefore. The server 210 is in yet a further embodiment located in the cloud, or anywhere in the public internet. In another embodiment it is located on another network connected to the operator network. In a yet further embodiment the server 210 is implemented in software or method integrated and executed from another server or apparatus, in a cloud, on the internet, on the operator network or a further adjacent network. The server 210 can in an embodiment be integrated in the operator network, i.e. in an embodiment physically resides with the network elements.

FIG. 4 further shows network traffic in accordance with the invention. The network traffic originating from the app 250 as zero rated through the server 210 to internet, e.g. to the services 120a and 120b or to the cloud service 220 for purchase information is shown with dotted line 401. The zero-rated rules are in an embodiment defined at the PCRF element 418 or in GGSN/PGW 414. Network traffic from application 110a executed in the apparatus 110 from the app 110a to the internet 120, via Wireless Local Area Network or the server 120a is shown with a dashed line 402.

Figure 5:
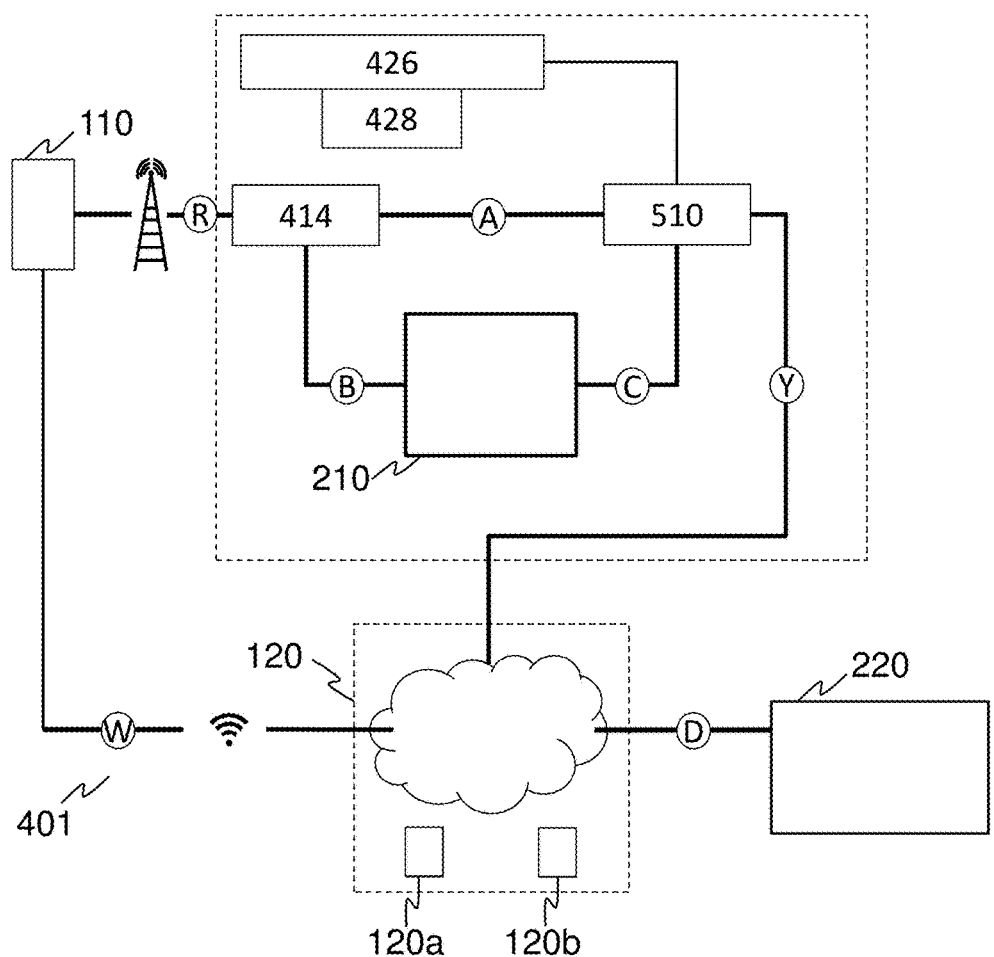
FIG. 5 shows a block diagram of example connections of a system according to an aspect of the invention and of the environment in which the system according to the invention is used.

FIG. 5 shows a block diagram of example connections of a system according to an aspect of the invention and of the environment in which the system according to the invention is used. FIG. 5, in addition to the elements previously shown, depicts an interface to the internet, or internet edge, 510. In an embodiment, the apparatus 110, for example through the app 250, is connected via R to the Operator Network e.g. through the Gateway GPRS Support Node/Packet Data Network Gateway (GGSN/PGW) element 414 which in turn is connected via A to the internet edge and via B to the server 210 again connected to the internet edge via C. The internet edge 510 is connected, i.e. the operator network is connected, to the internet 120 via Y and further to the integration API 428 and the mediation element 426. The Cloud 220 is connected to the internet 120 via D and the apparatus 110 is additionally or instead connected to the internet 120 via W through Wireless Local Area Network (WLAN). A skilled person appreciates that the server 210 in an embodiment resides physically for example outside the operator network elements or is for example implemented in a cloud as hereinbefore described.

Figure 6:
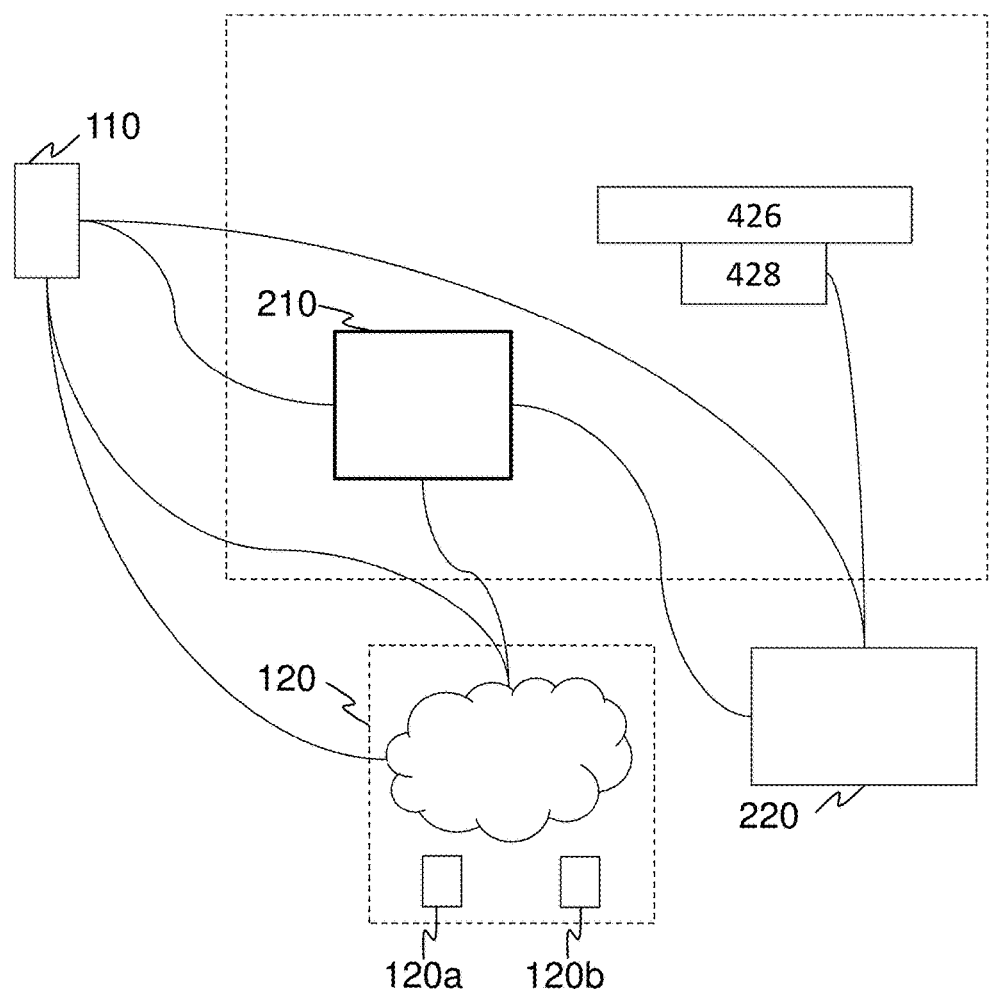
FIG. 6 shows a block diagram of a system according to an aspect of the invention and the example logical connections within.

FIG. 6 shows a block diagram of a system according to an aspect of the invention and the example logical connections shown with lines within. In an embodiment, the apparatus 110 is connected to the server 210 through a physical path R-B (FIG. 5) to the internet 120 through R-A-Y or W. The server 210 is connected to the cloud 220 through C-Y-D and to the internet 120 through C-Y. The cloud 220 is connected to the apparatus 110 through R-A-Y-D and to the integration API 428 through D-Y-V-P.

Figure 7:
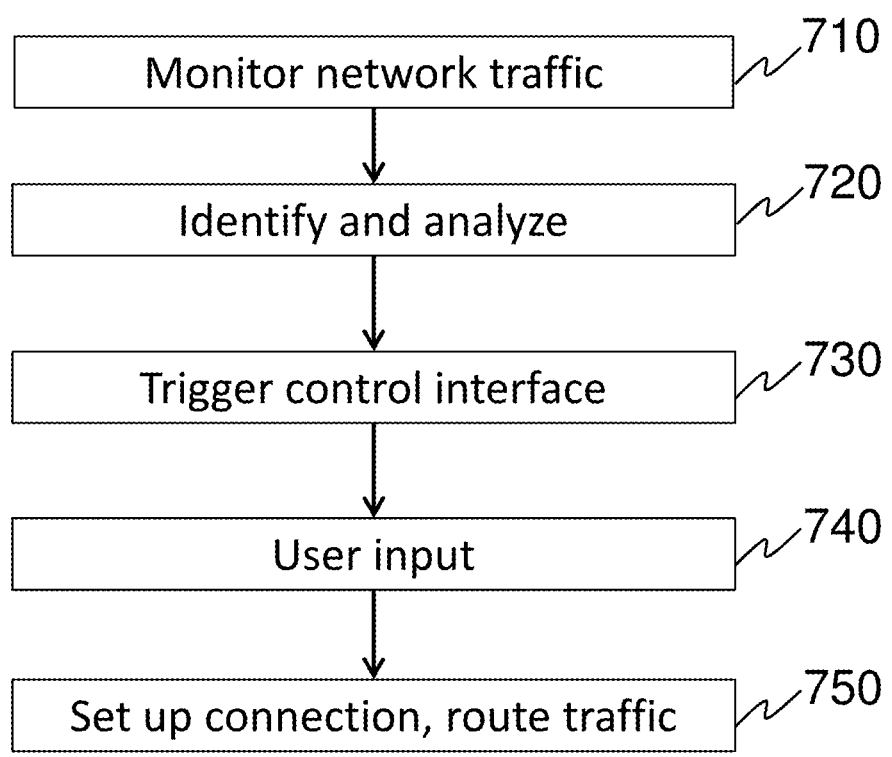
FIG. 7 shows a flow diagram of a method according to an aspect of the invention.

FIG. 7 shows a flow diagram of a method according to an aspect of the invention. It is to be noted that the method steps described hereinafter are configured to be carried out by executing the app 250 with the processor of the apparatus 110. In a further embodiment, the functionalities described are wholly or in part integrated into the processor and/or into further applications or into the operating system of the apparatus 110 in a different manner, i.e. a separate app 250 is not required but the processor is configured to carry out the described steps for example by executing components of the operating system.

At step 710 network traffic from the apparatus 110 is monitored, i.e. network traffic packets are monitored and detected. In an embodiment monitoring of the network traffic is dependent on the network connection used, for example if only Wireless Local Area Network is used, the monitoring is not carried out or carried out only intermittently. In a further embodiment monitoring is performed persistently in all network connections. In an embodiment, at step 710, also further activities of the apparatus 710 are monitored, such as user input or executed apps. The network traffic is in an embodiment monitored by monitoring for example the addresses, sockets, ports and user app identifications of the network packets.

At step 720 the detected network traffic is identified and analyzed, i.e. the context of the network traffic is determined in order to map the network traffic to a certain context, or origin, e.g. a user app. The context and origin of the network traffic is in an embodiment for example a consumer app 110a, such as a social media client, executed in the apparatus 110 and understandable to the user as a certain app she is using even if the network traffic was flowing to multiple destinations like 120a and 120b. In an embodiment the mapping is done to the originating app, for example if the network traffic is needed to load a web page in a browser app executed in the apparatus 110, but the page is entered by activating a link in a social media client app, the network traffic is mapped to the social media client app from which it originated. In a further embodiment, the mapping is alternatively done to the app that is being launched from the originating app allowing the user to have a separate data package for example for video links launched from an originating app. In a further embodiment the mapping is done to the app by detecting that the traffic to multiple destinations is originating within the same app 110a. For example when a social client app is used with traffic to 120a, the app also shows maps from an external service, such as service 120b and the traffic is mapped to the originating user and app, even if the app is using many network services. The analysis of the network traffic is carried out using an algorithm monitoring both the network traffic and further activities carried out with the apparatus. In an embodiment the apps in use are detected based on operating system identifiers on processes, sockets, operating system user identifiers, application package names and/or network destinations. In a further embodiment it is based on the runtime relationships of the apps, for example by detecting which app is executed on the foreground in the apparatus 110. In a further embodiment, analysis is carried out by detecting which operating system services, media servers and/or shared processes are in use. In a further embodiment, the analysis maps the user through the chain of ownership and services, for example a social mashup app is using a video app that is using a media server to send and receive traffic to internet. In an embodiment, the network traffic is mapped to the user and use of the social mashup app even if the network traffic goes to various IP addresses of video and TV services. In a still further embodiment, the history of app execution, network destinations or media service use of the apparatus 110 is used in analyzing the context and origin of the network traffic in order to map the network traffic to the right context and origin. In an embodiment, the algorithms used in detecting applications and/or their dependencies are updated from the server 210 and/or cloud 220 dynamically. It is to be noted, that all the embodiments described hereinbefore and hereinafter are in an embodiment implemented without changes or modifications to the operating system and kernel of the apparatus 110.

In a further embodiment, the network traffic is mapped to a further target, other than an app used in the device 110. The further target is for example subscription or a service available in the network, such as a paid video, audio, or television service, or a network destination or a protocol to be used. In a further embodiment, the traffic is not an app but advertising content within the app or within the apparatus 110 or the control interface of the app 250.

At step 730, first the triggering is decided, i.e. if a control interface should be presented and which control interface is to be presented, based on user context. In an embodiment it is decided if the triggering is needed. For example, if the user app has already been authorized to use data, e.g. by previously buying data, i.e. setting up data transfer for that app, or by using an earlier acquired data plan, or if the app is restricted to Wireless Local Area Network, WLAN, usage only, there is no triggering needed. In an embodiment, the control interface is presented only for the user apps on the foreground, to align with the user experience. In a further embodiment, the control interface is presented right after the app was removed from the foreground. In a further embodiment, the triggering is decided based on which app is actively listened to, watched to, given any user input thru a user interface element such as a keypad, a touch sensitive element, shaking device, twisting device or a sensor. In a yet further embodiment, the triggering decision depends on whether the app mapped as context or origin uses little or much data, has a sponsored offer, has a discounted or marketed offer, or has been given priority from any external system.

Further, at step 730, the control interface of the app 250 is triggered as needed based on the detected, identified and analyzed network traffic. The options 320*a-c* presented for the user depend on the context and origin of the network traffic. A skilled person appreciates that the number of options need not be three (as shown in FIG. 3*a*), but also depends on the situation, or information from the server 210 and/or cloud 220, such as number of options available. The presented options 320*a-c* depend in an embodiment on settings that the user of the apparatus 110 has determined for the context or origin of the network traffic. For example the user may have determined that a certain app may not generate network traffic, or that a certain app may only be used with a Wireless Local Area Network connection. Furthermore, the control interface in an embodiment comprises only a notification, for example in such a case that the user uses only little traffic, is doing so on the background or that the user has previously set up a valid wireless connection for the context or origin of the network traffic. In an embodiment, the notification provides the user with a possibility to act thereupon at a later convenience. In addition, in a further embodiment the interface is not a control interface but only an information interface that informs user without requiring any user input from the user. In a further embodiment, the presenting of control options is delayed, for example until the amount of network traffic from the mapper context reaches a predetermined limit.

In a further embodiment, the options 320*a-c* presented for the user depend on the history of the context or origin of the network traffic, for example if the originating app has generated a large amount of network traffic in the past, setup options with large bandwidth connections are presented. Furthermore, the options 320*a-c* presented for the user depend in an embodiment on previous choices the user has made. In a still further embodiment, the options 320*a-c* presented for the user depend on whether the context or origin of the network traffic has available setup options that have been sponsored or provided by a third party or for example the creator of the originating app and are available for use in the operator network in question. In a further embodiment, the control options 320*a-c* presented depend on further parameters, such as the account balance of the user, network congestion level or time of the day.

In an embodiment, the control options 320*a-c* are predetermined, i.e. the control options presented depended only on the context and/or origin of the network traffic. Accordingly, the apparatus 110 need not in an embodiment connect to the server 210 and/or cloud 220 in order to present the control options 320*a-c*. In such a case, the control options in an embodiment comprise for example a certain usage time for the context and/or origin, a certain amount of date to be transferred for the context and/or origin, a certain amount of data or usage time for all network traffic or unlimited amount of network traffic for an unlimited time for the context and/or origin or for all network traffic. In a further embodiment, at step 730 the control options 320*a-c* are in addition to or instead of predetermined options determined at the server 210 and/or cloud 220, and are retrieved therefrom prior to presenting them to the user of the apparatus 110. In an embodiment, the control options presented comprise the price of the option, i.e. the price to be paid by the user for setting up the wireless data transfer according to of the option. A skilled person appreciates that the control interface, i.e. the control options 320*a-c*, is in an embodiment presented to the user on top of the app 110*a* the user is utilizing or on top of the activity the user is undertaking without the user having to switch from the foreground activity to the control interface.

At step 740 user input is received, i.e. the user of the apparatus 110 selects one of the options 320*a-c*. In an embodiment, the user may also abandon the operation generating the network traffic. At step 750 the wireless connection is set up based on the user input, i.e. on the selection of one of the control options 320*a-c*. For example, if the user has chosen to set up a wireless connection for the originating app for a certain data amount, such connection is set up into the operator network using the server 210 and/or the cloud 220 and the connection is substantially immediately available for use in the device 110 from which it was set up.

The network traffic is routed based on predetermined setting and/or based on the user selection at step 740. For example, the user may have determined that a certain app always uses a presubscribed data package and in such a case the traffic is routed directly to the internet without re-routing through the server 210. Furthermore, should the apparatus 110 be connected to a network other than the operator network, for example a Wireless Local Area Network, the network traffic is directly routed to the internet. In such a case, the steps 730-740 are in an embodiment skipped entirely. In a further embodiment also step 720 is skipped entirely.

In an embodiment, the method recognizes the security architecture of each context and origin, i.e. the method does not alter the authenticity or security of any network traffic, for example the use of HTTPS. After setting up the connection at step 750 using the server 210 and the cloud 220, based on user selection, the network traffic is routed via the server 220 over TCP/IP and authenticated and authorized by the server and thereafter forwarded unmodified to the internet in accordance with the user selection in step 740. In an embodiment, data traffic between the apparatus 110, or the app 250, and the server 210 is zero-rated in order not to incur any extra costs to the user of the apparatus 110, i.e. to prevent charging for the data both in operator billing and through the cloud 220.

Figure 8:
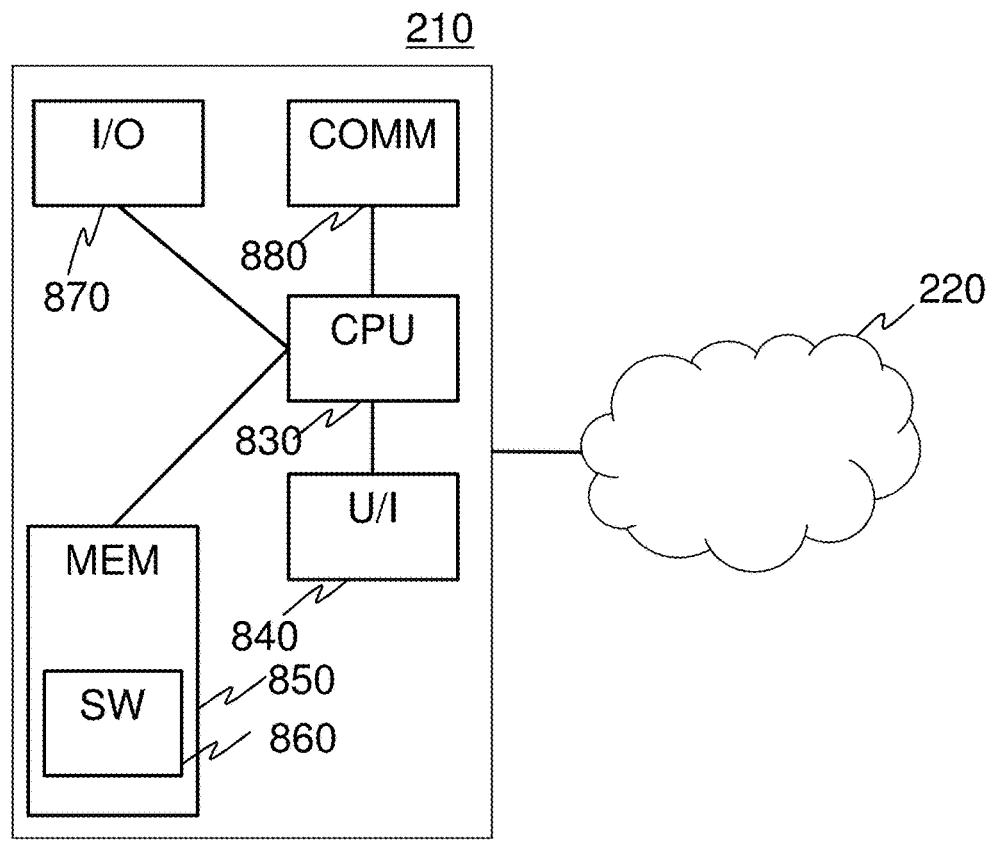
FIG. 8 shows a schematic a block diagram of an apparatus and a cloud service according to an embodiment of the invention.

FIG. 8 shows a schematic a block diagram of an apparatus, or server, 210 and a cloud service 220 according to an embodiment of the invention. The apparatus 210 in an embodiment comprises a communication interface module 880, a processor 830 coupled to the communication interface module 380, and a memory 850 coupled to the processor 830. The apparatus further comprises an input/output (I/O) unit 370 and the user interface (U/I) unit 340 as needed. In an embodiment, the apparatus 210 is integrated into another apparatus, i.e. is run as a virtual server on another physical server in which case the functionalities provided by the elements described hereinbefore or hereinafter are arranged with software using the physical elements of the further server.

The memory 850 comprises a work memory and a non-volatile memory such as a read-only memory, flash memory, optical or magnetic memory. In the memory 850, typically at least initially in the non-volatile memory, there is stored software 860 operable to be loaded into and executed by the processor 830. The software 360 may comprise one or more software modules and can be in the form of a computer program product that is software stored in a memory medium. In the context of this document, a "memory medium" may be any non-transitory media or means that can contain, store, communicate, propagate or transport the instructions for use by or in connection with an instruction execution system, apparatus, or device, such as a computer.

It shall be understood that any coupling in this document refers to functional or operational coupling; there may be intervening components or circuitries in between coupled elements unless expressly otherwise described.

The communication interface module 880 is configured to provide local communications over one or more local links. The links may be wired and/or wireless links. The communication interface 880 may further or alternatively implement telecommunication links suited for establishing links with other users or for data transfer, e.g. using the Internet. I an embodiment, the apparatus 210 is configured to communicate with various elements of an operator network and with the apparatus 110, or the app 250, as hereinbefore described.

The processor 830 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 8 shows one processor 830, but the apparatus 210 may comprise a plurality of processors. In an embodiment, the apparatus 210 comprises a processor operable to execute a method according to an embodiment of the invention in order to set up a context-dependent wireless data transfer according to the invention. A skilled person appreciates that in addition to the elements shown in FIG. 8, the apparatus 210 may comprise other elements, or some elements may be omitted.

FIG. 8 further shows a cloud service 220, implemented as conventional cloud service and connected to the apparatus 210 and to further services and/or systems such as to an operator network and the apparatus 100 as hereinbefore described. A skilled person appreciates that the cloud service 220 in an embodiment comprises an apparatus or a number of apparatuses such as the apparatus 220 or is implemented as a part of a further server or cloud service. In a further embodiment the Apparatus 210 is implemented as a method or a computer program that can be installed into the operator network and executed therein. In a yet further embodiment, the computer program or method is executed in the internet or in the cloud.

Figure 9:
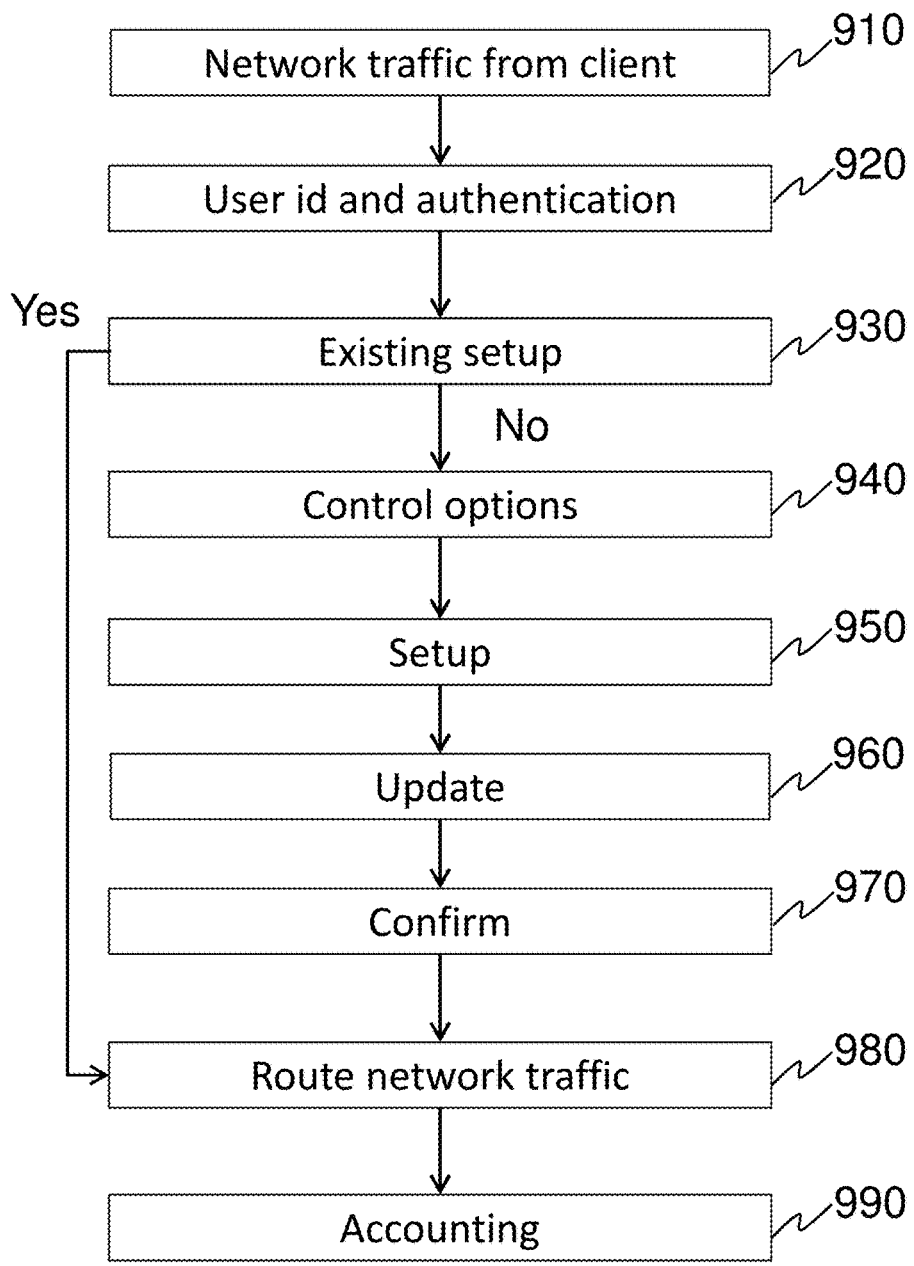
FIG. 9 shows a flow diagram of a method according to an aspect of the invention.

FIG. 9 shows a flow diagram of a method according to an aspect of the invention. It is to be noted that the method steps described hereinafter are configured to be carried out by executing them with the processor of the server 210 and/or in the cloud service 220. In a further embodiment, the functionalities described are wholly or in part carried out in a different manner, for example in the elements of an operator network, i.e. a dedicated server 210 and/or cloud service is not required if the described steps are configured to be carried out as a part of other elements of for example an operator network.

At step 910 network traffic request from a client is received, for example from an apparatus 110 with the app 250 via mobile operator network. At step 920 the user behind the network traffic is identified and authenticated. The identification is in an embodiment carried out using an identifier of the operator network used, such as a Mobile Subscriber Integrated Services Digital Network-Number (MSISDN), a device identifier such as an identifier calculated from an International Mobile Equipment Identifier (IMEI), and a user identity (USER ID) from the client app, server 210 and/or cloud 220 linking the user to her user account. The user identity is in an embodiment a randomly generated identifier. In an embodiment, the user is authenticated in a conventional manner in co-operation with the operator network, the server 210 and the cloud 220. In a further embodiment the user id comprises an e-mail address and a password.

At step 930 it is checked whether a wireless connection has been previously set up for the context and origin of the network traffic requested. For example, if the client has previously set up a wireless connection for an app 110a that wishes to use the network, and that connection still has time and data quota left, the network traffic is routed as hereinbefore described and the client is able to access the network at step 980. In a further embodiment, further parameters are considered, such as user account balance, network congestion level and/or time of the day. Information on previously set up connections is maintained with the user account at the server 210 and/or the cloud 220. If no previous set up exists, a number of control options is determined at step 940 and sent to the client. The control options are determined based on the context and origin of the requested network traffic, and for example previous history of the user account and/or special offers or sponsored connections available. If the client has used predetermined control options 320a-c as hereinbefore described, and one option has already been selected, step 940 is skipped.

At step 950, the requested connection, chosen by the user from the control options provided, is set up. The connection is set up, in an embodiment, by connecting to the operator network through operator specific billing interface, and a charging request is sent to the operator network. In a further embodiment a credit card, a bank account or a further digital money transfer is executed in the internet. In an embodiment, if a sponsored option is used, the money transfer is arranged through a third party billing arrangement. Once the operator network confirms the request to set up the connection, the server 210 and/or cloud 220 carries out the necessary authorizations for the user. The user account, for example on the server 210 and/or cloud 220 is updated at step 960 and a confirmation is sent to the client at step 970, e.g. to an apparatus 110. At step 980 the network traffic is routed as hereinbefore described and the user of the client is able to access the network.

At step 990, the usage of the network by the client apparatus is monitored, and track is kept of the time and data amount used, depending on the chosen setup.

In view of the foregoing, the different embodiments of the invention provide for a system that may be considered as a system using an enforcement and proxy server outside of the operator network to enable a creation of separate and differentiated mobile data products and the creation of differentiated pricing for mobile data depending e.g. on the context of the network traffic.

Without in any way limiting the scope of protection, interpretation or possible applications of the invention, a technical advantage of different embodiments of the invention may be considered to be a simple and user-friendly setup of a wireless connection from the device from which the connection will be used. Further, a technical advantage of different embodiments of the invention may be considered to be packaging mobile data into user understandable packages. Further, a technical advantage of different embodiments of the invention may be considered to be packaging mobile data into contextually relevant app packages. Further, a technical advantage of different embodiments of the invention may be considered to be a convenient setup of the wireless connection separately for a certain context or originating application. Further, a technical advantage of different embodiments of the invention may be considered to be the provision of the easy setup without modification to the apparatus or to the operator network. Further, a technical advantage of different embodiments of the invention may be considered to be the provision of control of wireless connections with an app downloadable to any device. Still further, a technical advantage of different embodiments of the invention may be considered to be the provision of wireless connectivity flexibly, on demand and just on time for an enhanced user experience. Still further, a technical advantage of different embodiments of the invention may be considered to be the provision of user specific control of setting up a wireless data transfer, i.e. knowing what the user might wish to purchase, using a client app requiring no changes to the apparatus and a server requiring no changes to the operator network.

The foregoing description provides non-limiting examples of some embodiments of the invention. It is clear to a person skilled in the art that the invention is not restricted to details presented, but that the invention can be implemented in other equivalent means. Some of the features of the above-disclosed embodiments may be used to advantage without the use of other features.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

As such, the foregoing description shall be considered as merely illustrative of the principles of the invention, and not in limitation thereof. Hence, the scope of the invention is only restricted by the appended patent claims.

The invention claimed is:

1. A computer-implemented method for setting up wireless data transfer, comprising:
   an application executing on an apparatus, the application performing the functions of:
   monitoring network traffic originating from the apparatus;
   mapping the network traffic to an originating application or to a second application launched from the originating application;
   determining that an application to which the network traffic has been mapped is not authorized to utilize a mobile network of the apparatus to transfer network data;
   presenting a plurality of control options, based on the mapping, for setting up a connection for data transfer on the mobile network a control option comprising a price of the control option and a specification of at least one of:
   an amount of data permitted to be transferred under the control option,
   an amount of time during which data is permitted to be transferred under the control option, or
   an application permitted to transfer data under the control option;
   setting up the connection based on a selected control option; and
   routing the network traffic using the connection.

2. The computer-implemented method according to claim 1, wherein monitoring network traffic comprises monitoring the addresses, sockets, ports, application identification of network packets, operating system user identifiers, application package names, or user identifications of the network packets.

3. The computer-implemented method according to claim 1, wherein the mapping comprises detecting dependencies between applications and dynamically updating algorithms used in the mapping.

4. The computer-implemented method according to claim 1, wherein mapping comprises mapping the network traffic to a service available in the network, mapping the network traffic to a network address, mapping the network traffic to a protocol to be used, or mapping the network traffic to a network-based subscription service.

5. The computer-implemented method according to claim 1, wherein presenting the control options comprises retrieving the control options from the network and displaying the control options on a user interface element.

6. The computer-implemented method according to claim 1, wherein the control options further comprise a sponsored data transfer.

7. The computer-implemented method according to claim 1, wherein the control options are based upon a history of the mapping of the network traffic.

8. The computer-implemented method according to claim 1, wherein the control options include predetermined control options based upon the mapping of the network traffic.

9. The computer-implemented method according to claim 1, wherein routing network traffic comprises routing the network traffic based upon a previously configured connection for an application when the previously configured connection has a remaining time quota or a remaining data quota.

10. An apparatus comprising:
    a processor; and
    a non-transitory computer-readable storage medium storing an application that, when executed by the processor, configure the processor to cause:
    monitoring network traffic originating from the apparatus;
    mapping the network traffic to an originating application or to a second application launched from the originating application;
    determining that an application to which the network traffic has been mapped is not authorized to utilize a mobile network of the apparatus to transfer network data;
    presenting a plurality of control options, based on the mapping, for setting up a connection for data transfer on the mobile network a control option comprising a price of the control option and a specification of at least one of:
    an amount of data permitted to be transferred under the control option,
    an amount of time during which data is permitted to be transferred under the control option, or an application permitted to transfer data under the control option;

setting up the connection based on a selected control option; and routing the network traffic using the connection.

11. The apparatus according to claim 10, wherein the processor is configured to monitor the network traffic by monitoring the addresses, sockets, ports, application identification of network packets, operating system user identifiers, application package names, or user identifications of network packets.

12. The apparatus according to claim 10, wherein mapping the network traffic comprises detecting dependencies between applications and dynamically updating algorithms used in the mapping.

13. The apparatus according to claim 10, wherein the processor is configured to determine the mapping of the network traffic by mapping the network traffic to a service available in the network, mapping the network traffic to a network address, mapping the network traffic to a protocol to be used, or mapping the network traffic to a network-based subscription service.

14. The apparatus according to claim 10, wherein the processor is configured to retrieve the control options from the network and present the control options on a user interface element of the apparatus.

15. The apparatus according to claim 10, wherein the control options further comprise a sponsored data transfer.

16. The apparatus according to claim 10, wherein the control options are based upon a history of the determined origin mapping of the network traffic.

17. The apparatus according to claim 10, wherein the control options comprise predetermined control options based upon the mapping of the network traffic.

18. The apparatus according to claim 10, wherein the processor is configured to cause routing the network traffic based upon a previously configured connection for an application when the previously configured connection has a remaining time quota or a remaining data quota.

19. An article comprising a non-transitory computer-readable storage medium storing an application that, when executed by a processor, enable an apparatus to:

monitor network traffic originating from the apparatus;

create a mapping of the network traffic to an originating application or to a second application launched from the originating application;

determine that an application to which the network traffic has been mapped is not authorized to utilize a mobile network of the apparatus to transfer network data;

present a plurality of control options, based on the, for setting up a connection, for data transfer on a mobile network, a control option comprising a price of the control option and a specification of at least one of:
an amount of data permitted to be transferred under the control option,
an amount of time during which data is permitted to be transferred under the control option, or
an application permitted to transfer data under the control option;

setting up the connection based on a selected control option; and route the network traffic using the connection.

20. The article of claim 19, wherein monitoring network traffic comprises monitoring the addresses, sockets, ports, application identification of network packets, operating system user identifiers, application package names, or user identifications of network packets.

21. The article of claim 19, wherein the mapping comprises detecting dependencies between applications and dynamically updating algorithms used in the mapping.

22. The article of claim 19, wherein mapping comprises mapping the network traffic to a service available in the network, mapping the network traffic to a network address, mapping the network traffic to a protocol to be used, or mapping the network traffic to a network-based subscription service.

23. The article of claim 19, wherein presenting the control options comprises retrieving the control options from the network and displaying the control options on a user interface element.

24. The article of claim 19, wherein the control options further comprise a sponsored data transfer.

25. The article of claim 19, wherein the control options are based upon a history of the mapping of the network traffic.

26. The article of claim 19, wherein the control options include predetermined control options based upon the mapping of the network traffic.

27. The article of claim 19, wherein routing network traffic comprises routing the traffic based upon a previously configured connection for an application when the previously configured connection has a remaining time quota or a remaining data quota.

* * * * *